(12) United States Patent
Chang

(10) Patent No.: US 9,142,123 B2
(45) Date of Patent: *Sep. 22, 2015

(54) LOW-POWER AND BATTERY-FREE TRANSMITTER FOR REMOTE CONTROL

(71) Applicant: FAVEPC Inc., Chu-Pei, Hsin-Chu County (TW)

(72) Inventor: Shao-Chang Chang, Chu-Pei (TW)

(73) Assignee: FAVEPC INC., Chu-Pei, Hsin-Chu County (TW)

( * ) Notice: Subject to any disclaimer, the term of this patent is extended or adjusted under 35 U.S.C. 154(b) by 275 days.

This patent is subject to a terminal disclaimer.

(21) Appl. No.: 13/793,203

(22) Filed: Mar. 11, 2013

(65) Prior Publication Data

US 2014/0254326 A1 Sep. 11, 2014

(51) Int. Cl.
*H04L 17/02* (2006.01)
*G08C 23/02* (2006.01)
*H04B 1/034* (2006.01)
*H04B 1/16* (2006.01)

(52) U.S. Cl.
CPC ............... *G08C 23/02* (2013.01); *H04B 1/034* (2013.01); *H04B 1/1607* (2013.01)

(58) Field of Classification Search
CPC ....................................................... G08C 23/02
USPC .................................. 367/197; 341/173, 176
See application file for complete search history.

(56) References Cited

U.S. PATENT DOCUMENTS

| 2005/0008168 A1* | 1/2005 | Pompei | 381/77 |
| 2014/0254327 A1* | 9/2014 | Chang | 367/197 |
| 2014/0254803 A1* | 9/2014 | Chang | 381/28 |

\* cited by examiner

*Primary Examiner* — Eric M Blount
(74) *Attorney, Agent, or Firm* — Muncy, Geissler, Olds & Lowe, P.C.

(57) ABSTRACT

A transmitter for remote control, the transmitter includes a first analog-to-digital converter (ADC) configured to receive a first audio signal from a electronic device and convert the first audio signal to a first direct-current (DC) signal, a first boost circuit electrically connected to the first ADC to receive and amplify the first DC signal, and a transmission module electrically connected to the first boost circuit to receive the amplified first DC signal, wherein the amplified first DC signal is configured to modulate a carrier signal generated by the transmission module and the first audio signal is one of a left channel audio signal and a right channel audio signal output from the electronic device through an audio connector.

24 Claims, 11 Drawing Sheets

US 9,142,123 B2

LOW-POWER AND BATTERY-FREE TRANSMITTER FOR REMOTE CONTROL

BACKGROUND OF THE INVENTION

The present invention relates generally to a low-power transmitter and, more particularly, to a low-power and battery-free transmitter for remote control.

Portable electronic devices, such as smart phones, tablet computers or the like, would have taken an important part in daily life. Various application software have been created or developed to work with a portable electronic device to perform certain functions, for example navigation, video games, video/audio display, electronic commerce, etc.

Among the aforesaid application software, one is developed and performed by a portable electronic device to remotely control another electronic products. FIG. 1A is a schematic block diagram of a conventional remote control system A which employs a portable electronic device 11. Referring to FIG. 1A, the remote control system A may include a remote control 1 and an electronic device 2. The remote control 1 may further include a transmitter 10 which can be connected to the portable electronic device 11 through an audio connector 12. Accordingly, a audio signal may be sent from the portable electronic device 11 to the transmitter 10. The audio signal from the portable electronic device 11 may have a predefined format so that the audio signal may serve as a modulation signal and/or control signal. The electronic device 12 may contain a receiver (not shown) to receive the modulation signal/control signal from the portable electronic device 11.

FIG. 1B is a block diagram of the remote control 1 in the remote control system A of FIG. 1A. Referring to FIG. 1B, the transmitter 10 of the remote control 1 may include a transmission module 14 configured to send out a modulation signal, such as a radio-frequency (RF) signal or an infrared (IR) signal. The transmission module 14 may consume lots of power and thus require an external power supply. Accordingly, the transmitter 10 may further include a battery 15, which may inevitably increase the size and cost of the transmitter 10.

It may therefore desirable to have a remote control which is equipped with a light and compact transmitter without external power supply.

BRIEF SUMMARY OF THE INVENTION

Examples of the present invention may provide a transmitter for remote control, the transmitter includes a first analog-to-digital converter (ADC) configured to receive a first audio signal from a electronic device and convert the first audio signal to a first direct-current (DC) signal, a first boost circuit electrically connected to the first ADC to receive and amplify the first DC signal, and a transmission module electrically connected to the first boost circuit to receive the amplified first DC signal, wherein the amplified first DC signal is configured to modulate a carrier signal generated by the transmission module and the first audio signal is one of a left channel audio signal and a right channel audio signal output from the electronic device through an audio connector.

Some examples of the present invention may provide a transmitter for a remote control in a remote control system, the transmitter comprising a first analog-to-digital converter (ADC) configured to receive a first audio signal from a electronic device and convert the first audio signal to a first direct-current (DC) signal, a first boost circuit electrically connected to the first ADC to receive and amplify the first DC signal, and a transmission module electrically connected to the first boost circuit to receive the amplified first DC signal, the transmission module comprising a phase-locked loop (PLL) frequency synthesizer and a power amplifier (PA) to generate a carrier signal, wherein the amplified first DC signal is configured to modulate the carrier signal and the first audio signal is one of a left channel audio signal and a right channel audio signal output from the electronic device through an audio connector.

Still other examples of the present invention may provide an integrated circuit which includes a transmitter, wherein the integrated circuit connects to a wire, the wire includes a first line for transmitting an audio signal and a second line for transmitting an electromagnetic signal, wherein the integrated circuit connects to an audio connector through the wire.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION OF THE INVENTION

Reference will now be made in detail to the present examples of the invention, examples of which are illustrated in the accompanying drawings. Wherever possible, the same reference numbers will be used throughout the drawings to refer to the same or like parts.

Figure 1A:
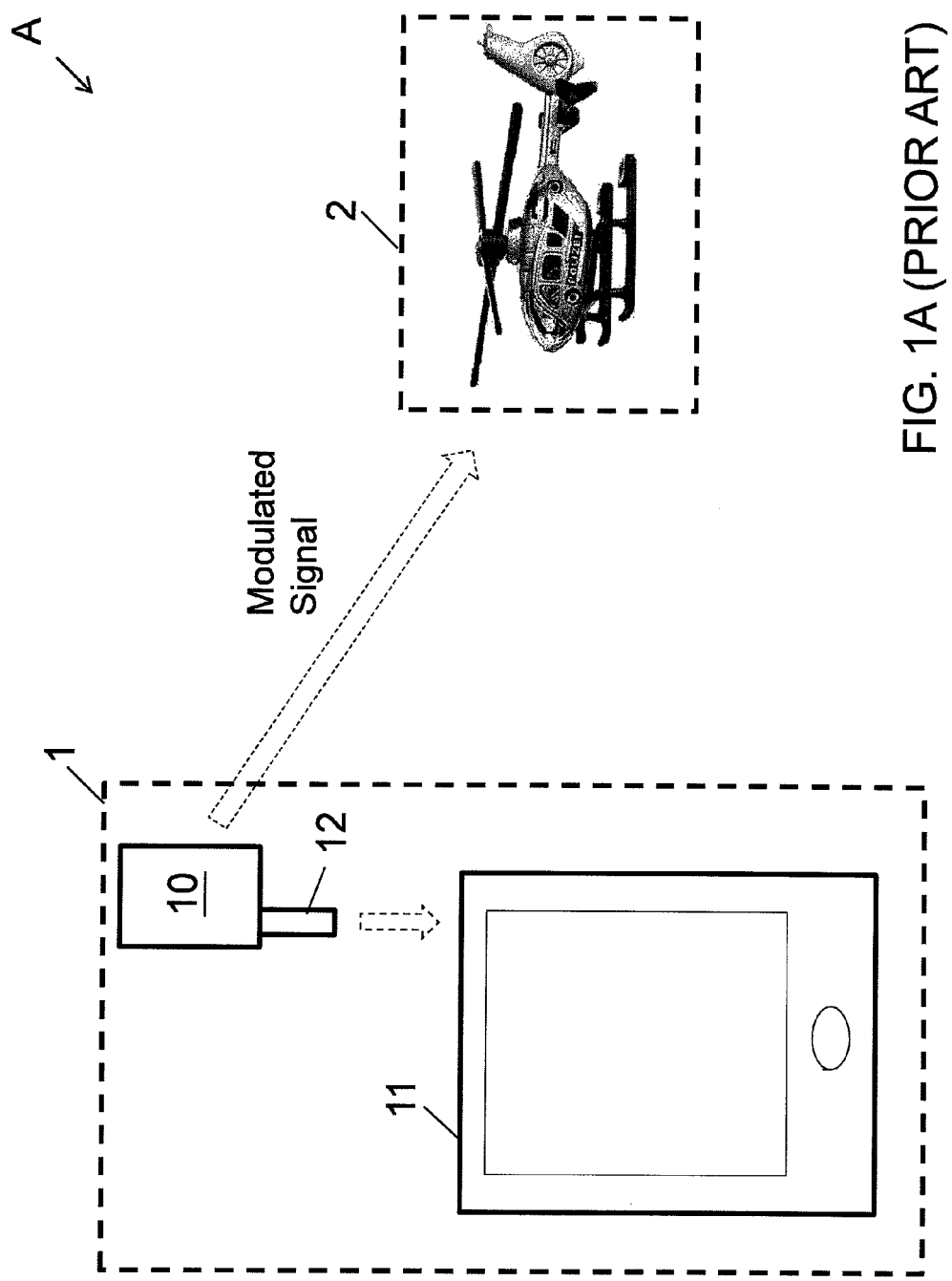
FIG. 1A is a schematic block diagram of a conventional remote control system which employs a portable electronic device.
Figure 1B:
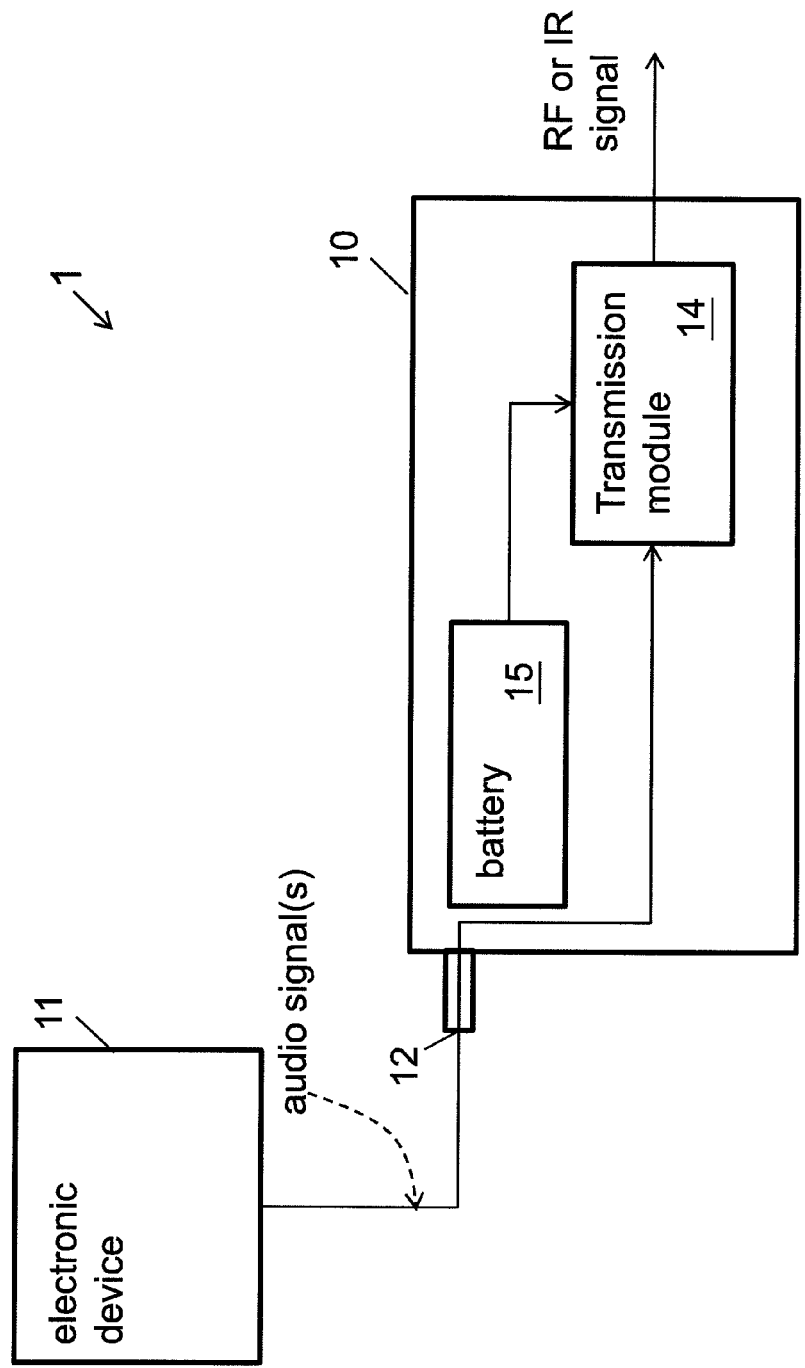
FIG. 1B is a block diagram of the remote control in the remote control system of FIG. 1A.
Figure 2:
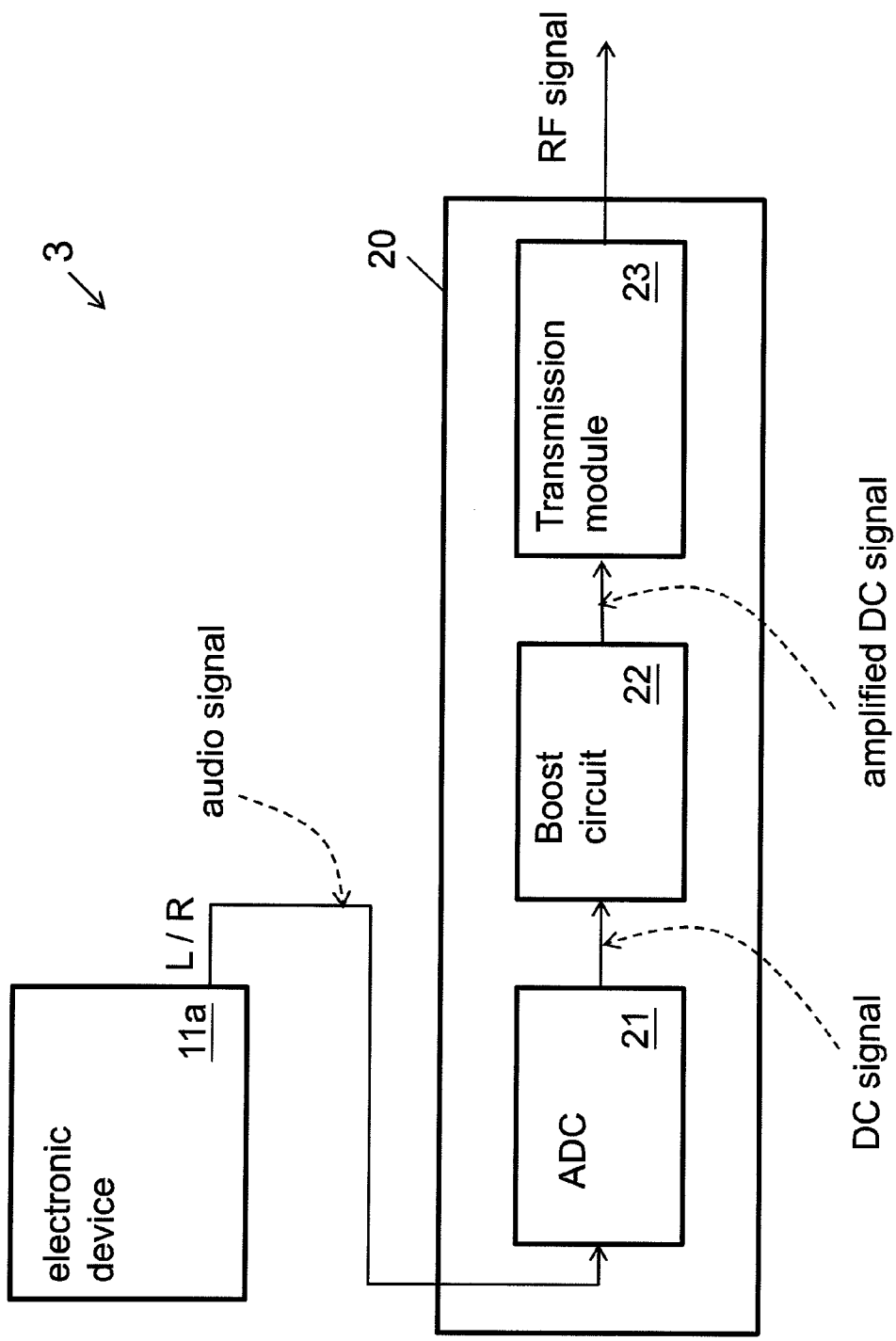
FIG. 2 is a block diagram of a remote control in accordance with an example of the present invention.

FIG. 2 is a block diagram of a remote control 3 in accordance with an example of the present invention. Referring to FIG. 2, the remote control 3 may include an electronic device 11a and a transmitter 20, and the transmitter 20 may connected to the electronic device 11a through an audio connector (not shown), such as a phone connector. The electronic device 11a may include a smart phone, a tablet computer, a laptop computer or the like. Furthermore, the transmitter 20 may include an analog-to-digital converter (ADC) 21, a boost circuit 22 and a transmission module 23. The ADC 21, the boost circuit 22 and the transmission module 23 may be connected in series so that the boost circuit 22 may be connected between the ADC 21 and the transmission module 23.

The transmitter 20 may be configured to receive an audio signal from the electronic device 11. The audio signal may include one of a left channel audio signal L and a right channel audio signal R which may be generated by the electronic device 11a, wherein each of the left channel audio signal L and the right channel audio signal R may be a sinusoidal signal having a root-mean-square-voltage of approximately 0.5 volt-root-mean-square (Vrms) and a power of approximately 15 milliwatt (mW). The audio signal may be sent to the ADC 21, which may be configured to convert the audio signal to a direct-current (DC) signal. In this example of the present invention, the DC signal may have a DC voltage of approximately 0.3 volt (V) and a power of approximately 9 mW, and the conversion efficiency achieved by the ADC is approximately 60%.

Furthermore, the DC signal may be sent to the boost circuit 22, which may be configured to amplify the DC signal. In this example of the present invention, the amplified DC signal may have a DC voltage of approximately 1.6V and a current of approximately 1.7 milliampere (mA). Accordingly, the amplified DC signal may have a power of approximately 2.72 mW, and the conversion efficiency achieved by the boost circuit 22 is approximately 30%. In another example of the present invention, the boost circuit 22 may have a conversion efficiency greater than 30%.

The transmission module 23 may be referred to the wireless short range transmitter as disclosed in U.S. Patent Publication—US2012229307A1. As described in US2012229307A1, the wireless short range transmitter may be able to deal with a modulation signal or control signal having a DC voltage of approximately 1.6V and a current of approximately 500 microampere (μA). Accordingly, the transmission module 23 may also be able to deal with modulation signal or control signal of same voltage and current level. In other words, the transmission module 23 may be able to transmit the modulation signal or control signal without external power supply. Exemplary hardware structures of the transmitter 20 will be described in the followings with reference to FIGS. 3A, 3C, 4 and 5A.

Figure 3A:
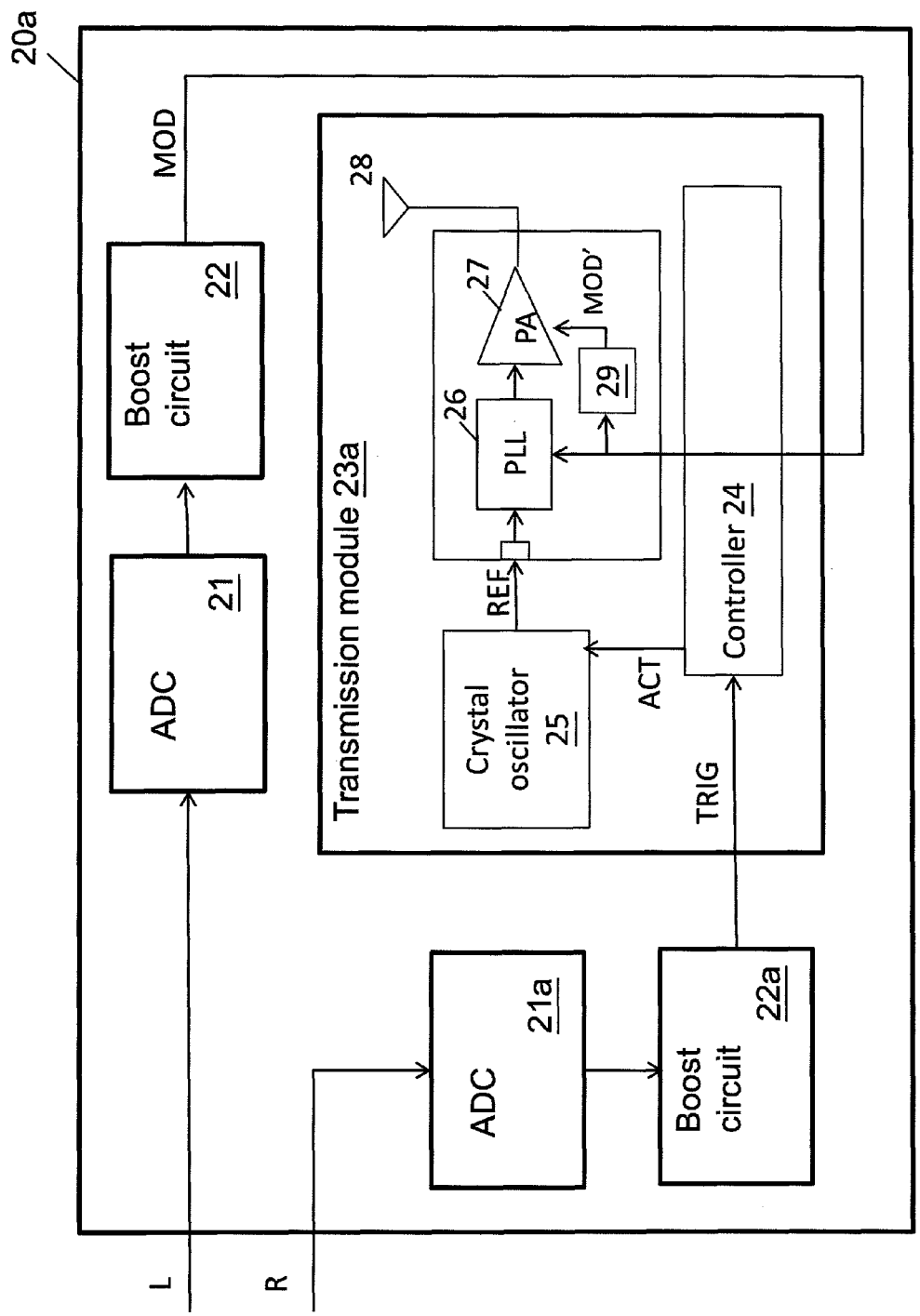
FIG. 3A is a block diagram of a transmitter in accordance with an example of the present invention.

FIG. 3A is a block diagram of a transmitter 20a in accordance with an example of the present invention. Referring to FIG. 3A, the transmitter 20a may be similar to the transmitter 20 described and illustrated with reference to FIG. 2 except that, the transmitter 20a may further include an ADC 21a and a boost circuit 22a connected between the ADC 21a and the transmission module 23a. The transmission module 23a of the transmitter 20a may be similar to the transmission module 23 described and illustrated with reference to FIG. 2. The transmission module 23a may include a controller 24, a crystal oscillator 25, a phase-locked-loop (PLL) frequency synthesizer 26, a power amplifier (PA) 27, an antenna 28 and a delay circuit 29.

The controller 24 may receive a trigger signal TRIG to generate an activation signal ACT. The activation signal ACT may be used to activate the crystal oscillator 25 to generate a reference signal REF. The reference signal REF may then be sent to the PLL frequency synthesizer 26. The PLL frequency synthesizer 26 and PA 27 may be configured to generate a carrier signal based on the reference signal REF. The carrier signal may contain the information of interests. The antenna 28 may be configured to convert the modulated carrier signal to an RF signal. The RF signal may then be transmitted by the antenna 28 to an external electronic device (not shown).

Advantageously, the controller 24 of the transmission module 23a may not need a modulator to modulate the carrier signal generated by the PLL frequency synthesizer 26 and the PA 27. The left channel audio signal L from the electronic device 11a, which may be converted by the ADC 21 and amplified by the boost circuit 22, may serve as a modulation signal MOD for modulating the carrier signal generated by the PLL frequency synthesizer 26 and the PA 27. Furthermore, the right channel audio signal R from the electronic device 11a, which may be converted by the ADC 21a and amplified by the boost circuit 22a, may serve as the trigger signal TRIG.

An application software which is installed or stored in the electronic device 11a may change signal pattern of each of the left channel audio signal L and right channel audio signal R. Signals L and R having pattern given by the application software may be used to cooperate with the transmitter 20a.

Figure 3B:
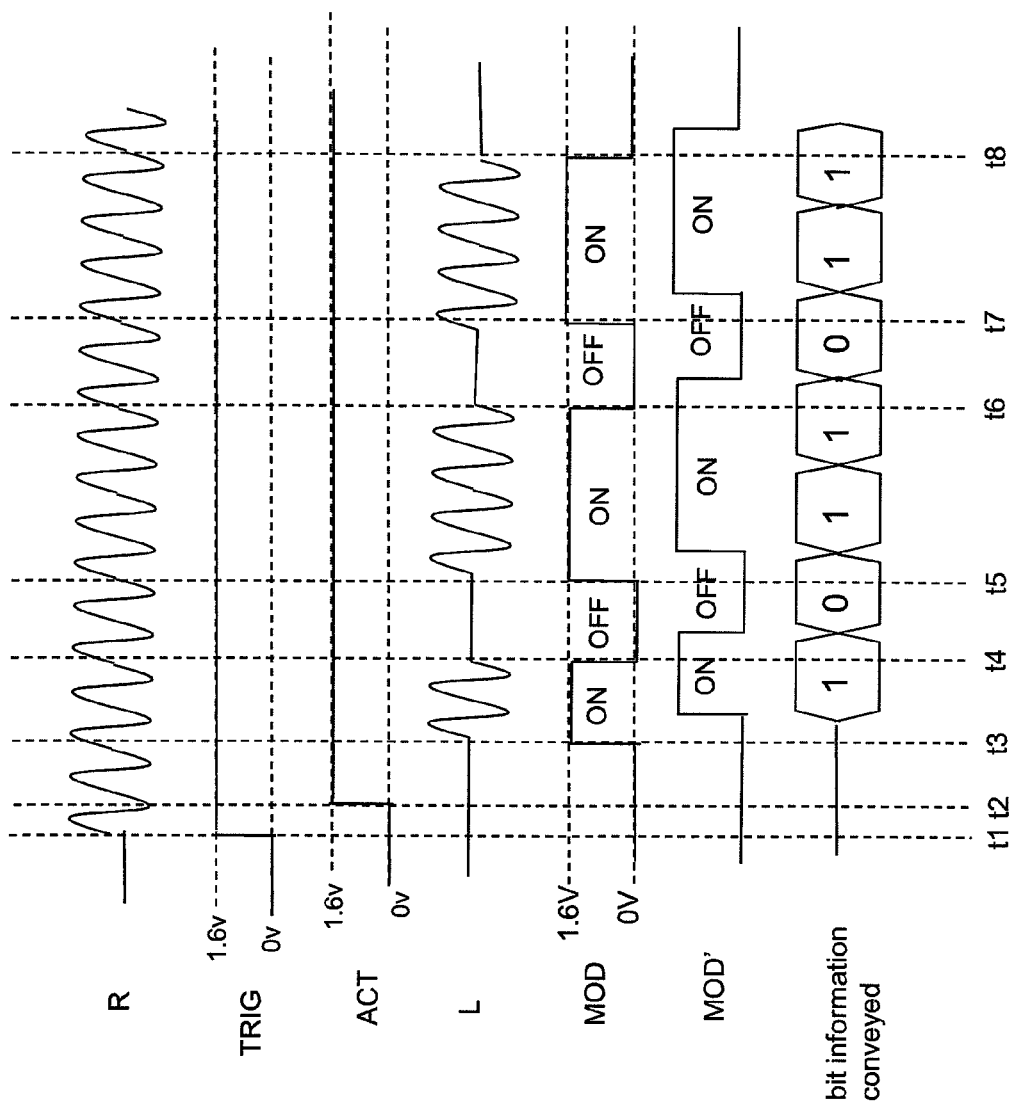
FIG. 3B is a timing sequence describing the left channel audio signal, the right channel audio signal and corresponding control signal(s) and modulation signal(s) in the transmitter of FIG. 3A.

FIG. 3B is a timing sequence describing the left channel audio signal L, the right channel audio signal R and corresponding control signal(s) and modulation signal(s) in the transmitter 20a of FIG. 3A. Referring to FIG. 3B, the application software may ask the electronic device 11a to continuously generate the right channel audio signal R at t1. Accordingly, the trigger signal TRIG which may be obtained by converting and then amplifying the right channel audio signal R, may turn to a DC voltage of approximately 1.6V at t1. The trigger signal TRIG may trig the controller 24 at t1 and thereafter the controller 24 may generate an activation signal ACT at t2. The activation signal ACT may also have a DC voltage of approximately 1.6V. In response to the activation signal ACT, the crystal oscillator 25 may generate a reference signal REF and send the same to the PLL frequency synthesizer 26. The PLL frequency synthesizer 26 and the PA 27 may then generate a carrier signal based on the reference signal REF.

Next, at t3, the application software may ask the electronic device 11a to intermittently generate the left channel audio signal L, for example, the electronic device 11a may generate the left channel audio signal L during the period between t3 and t4, the period between time points t5 and t6 and the period between t7 and t8. Accordingly, the modulation signal MOD, which may be obtained by converting and then amplifying the left channel audio signal L, may have a DC voltage of approximately 1.6V during the period between t3 and t4, the period between t5 and t6 and the period between t7 and t8. Moreover, the modulation signal MOD may have a voltage of approximately 0V during the period between t4 and t5 and the period between t6 and t7. In the ON-OFF-Keying (OOK)

modulation scheme, the DC voltage of approximately 1.6V may direct to an "ON" state, whereas the voltage of approximately 0V may direct to an "OFF" state. Therefore, the modulation signal MOD may be used to perform the OOK modulation.

Referring back to FIG. 3A, the modulation signal MOD may be directly sent to the PLL frequency synthesizer 26 and the delay circuit 29. Furthermore, another modulation signal MOD' may be generated by delaying the modulation signal MOD through the delay circuit 29. Accordingly, referring back to FIG. 3B, the modulation signal MOD' may have a delayed "ON-OFF" state-transition pattern with respect to the modulation signal MOD. Based on the "ON-OFF" state-transition patterns of the modulation signals MOD and MOD', the carrier signal generated by the PLL frequency synthesizer 26 and PA 27 may be modulated to convey bits information of "1011011."

In another example of the present invention, the left channel audio signal L and the right channel audio signal R may be switched. In other words, the right channel audio signal R may be converted by the ADC 21 and amplified by the boost circuit 22 to serve as the modulation signal MOD. The left channel audio signal L may be converted by the ADC 21a and amplified by the boost circuit 22a to serve as the trigger signal TRIG.

Figure 3C:
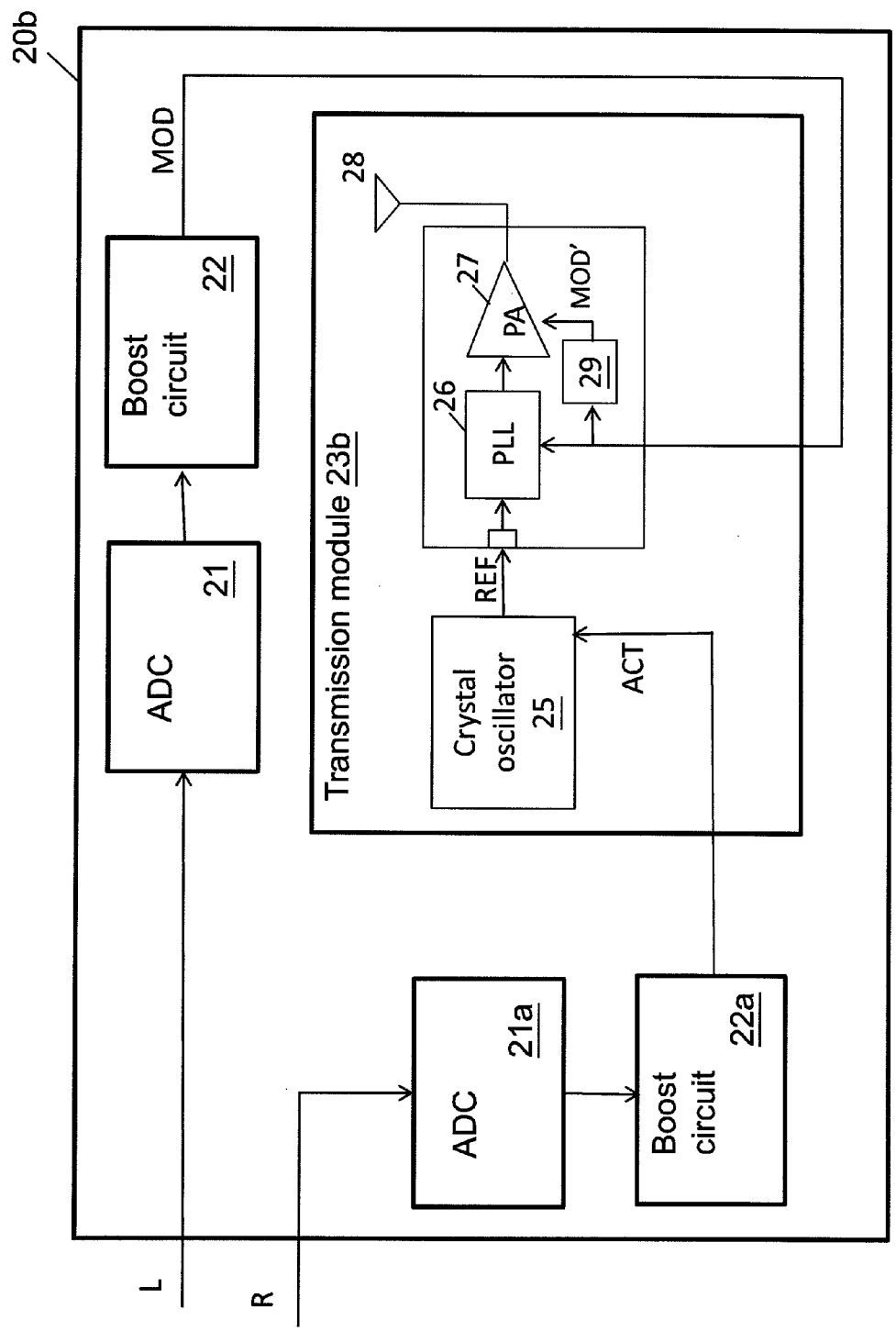
FIG. 3C is a block diagram of a transmitter in accordance with another example of the present invention.

FIG. 3C is a block diagram of a transmitter 20b in accordance with another example of the present invention. Referring to FIG. 3C, the transmitter 20b may be similar to the transmitter 20a as described and illustrated with reference to FIG. 3A except that the transmission module 23b of the transmitter 20b may not include a controller to generate the activation signal ACT for activating the crystal oscillator 25. In the present example, the right channel audio signal R from the electronic device 11a may be converted by the ADC 21a and amplified by the boost circuit 22a to serve as an activation signal ACT.

In another example of the present invention, the left channel audio signal L and the right channel audio signal R may be switched. In other words, the right channel audio signal R may be converted by the ADC 21 and amplified by the boost circuit 22 to serve as the modulation signal MOD. The left channel audio signal L may be converted by the ADC 21a and amplified by the boost circuit 22a to serve as the activation signal ACT to activate the crystal oscillator 25.

Figure 4:
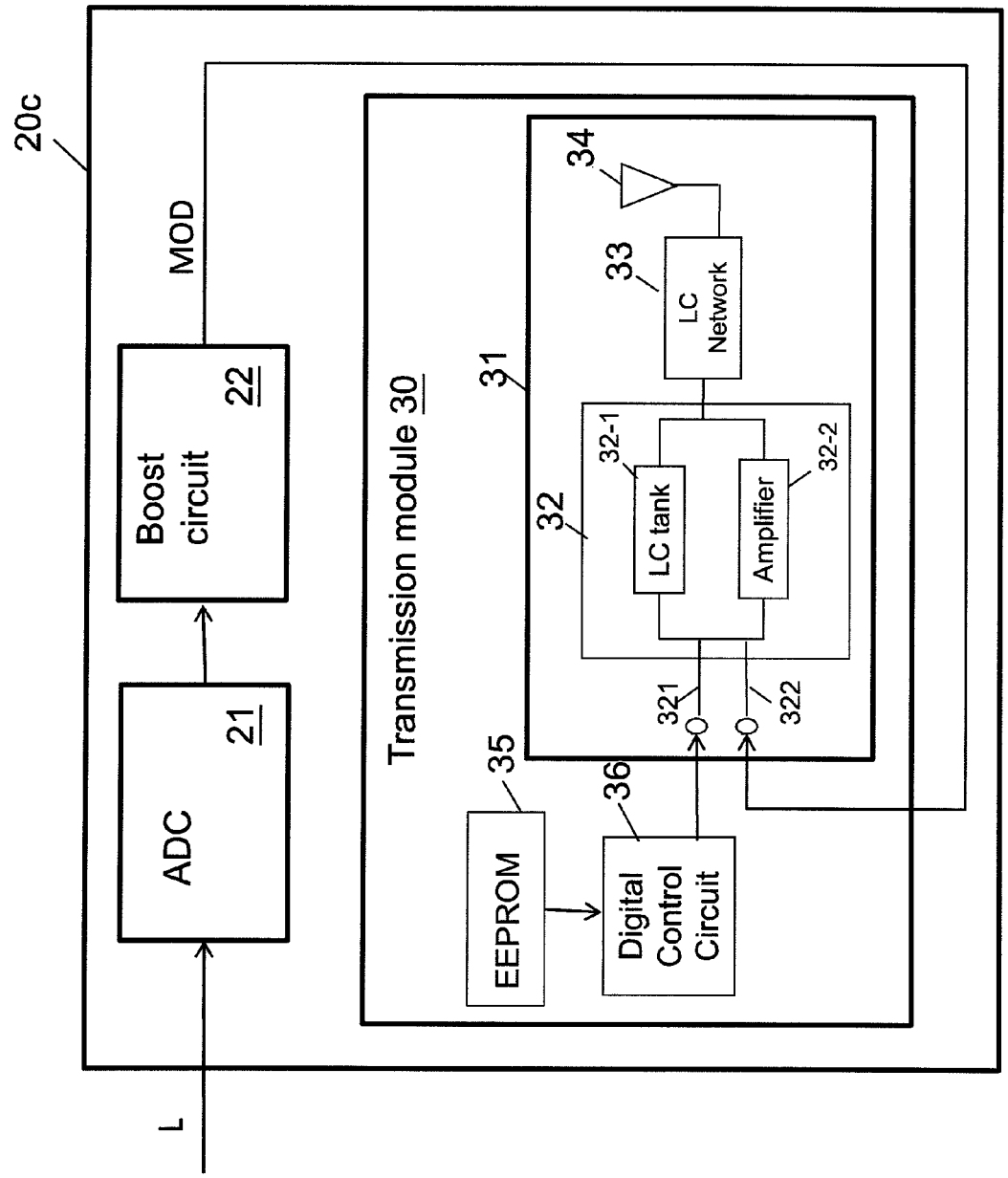
FIG. 4 is a block diagram of a transmitter in accordance with still another example of the present invention.

FIG. 4 is a block diagram of a transmitter 20c in accordance with still another example of the present invention. Referring to FIG. 4, the transmitter 20c may be similar to the transmitter 20a as described and illustrated with reference to FIG. 3A except that the transmission module 30 of the transmitter 20c may further include a carrier generator 31. Furthermore, unlike the transmitter 20a, the transmitter 20c may not include the ADC 21a and boost circuit 22a The carrier generator 31 may include an oscillator 32, an inductor-and-capacitor ("LC") network 33 and an antenna 34. The oscillator 32 may include a LC tank 32-1, an amplifier 32-2, one or more trimming pin(s) 321 and a modulation pin 322. The LC tank 32-1 may serve to generate a carrier signal at a predetermined carrying frequency and the amplifier 32-2 may be configured to amplify the amplitude of the carrier signal generated by the LC tank 32-1.

The transmission module 30 may further include a memory device such as electrically erasable programmable read-only memory (EEPROM) 35 and a digital control circuit 36. A predetermined frequency select signal may be stored in the EEPROM 35, and the digital control circuit 36 may be configured to retrieve the predetermined frequency select signal from the EEPROM 35 and send the same to the oscillator 32 through the trimming pin 321. The predetermined frequency select signal may serve to adjust the frequency of the carrier signal generated by the LC tank 32-1.

Furthermore, the left channel audio signal L from the electronic device 11a may be converted by the ADC 21 and amplified by the boost circuit 22 to serve as a modulation signal MOD. The modulation signal MOD may be sent to the oscillator 32 through the modulation pin 322 and serve to modulate the carrier signal generated by the LC tank 32-1. Moreover, the modulated carrier signal may then be sent to the antenna 34 through the LC network 33. The LC network 33 may be configured to provide an impedance facilitating oscillation of the oscillator 32, and the antenna 34 may be configured to convert the modulated carrier signal to an RF signal and transmit the same.

In another example of the present invention, the right channel audio signal R and the left channel audio signal L may be switched. That is, the right channel audio signal R may be converted by the ADC 21 and amplified by the boost circuit 22 to serve as the modulation signal MOD to modulate the carrier signal generated by the LC tank 32-1.

Figure 5A:
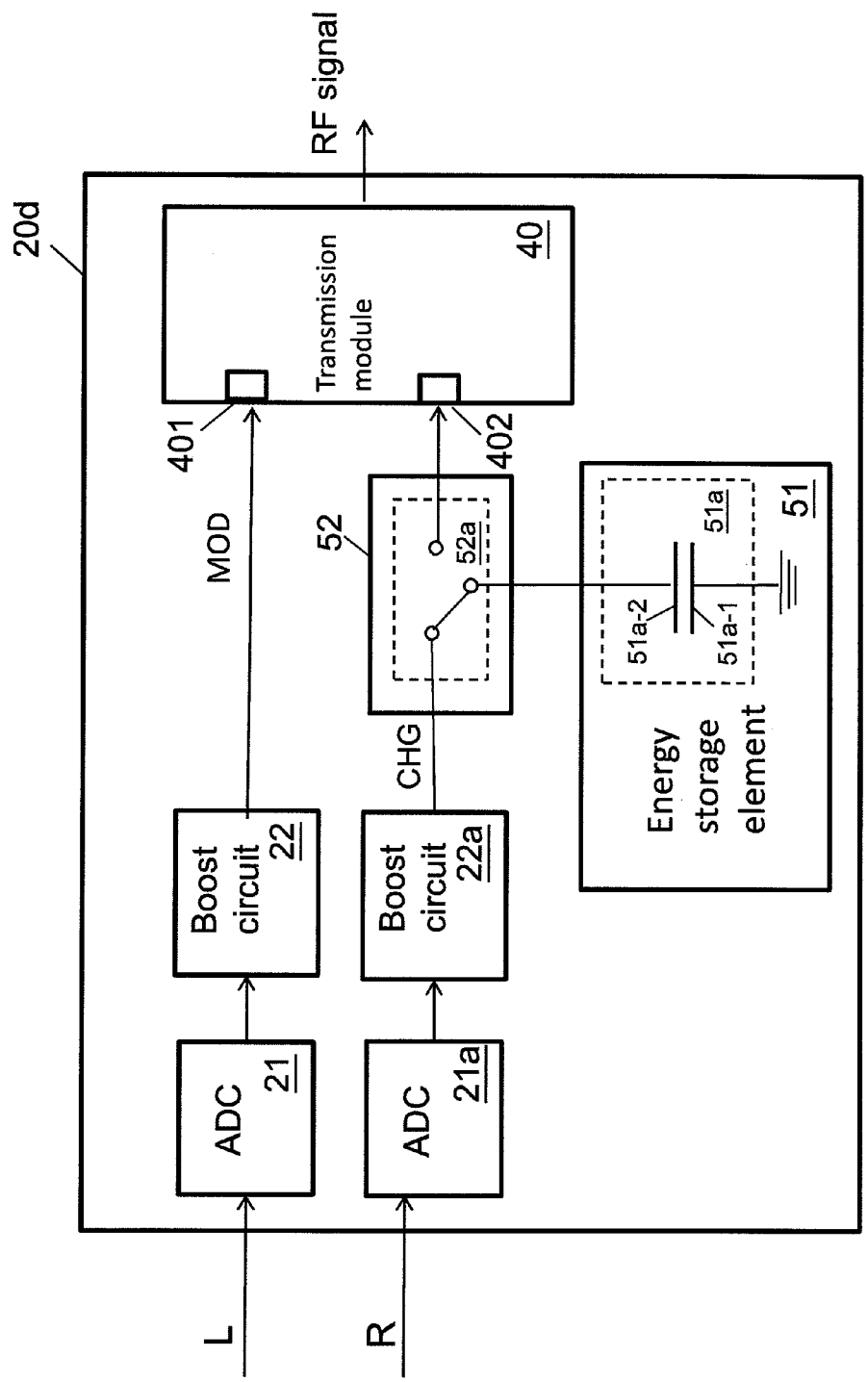
FIG. 5A is a block diagram of a transmitter in accordance with yet another example of the present invention.

FIG. 5A is a block diagram of a transmitter 20d in accordance with yet another example of the present invention. Referring to FIG. 5A, the transmitter 20d may be similar to the transmitter 20a as described and illustrated with reference to FIG. 3A except that the transmitter 20d may further include an energy storage element 51 and a switching circuit 52. Furthermore, the transmission module 40 of the transmitter 20d may operate at, for example, a voltage of approximately 1.8V and a current of approximately 3 mA. In other words, the transmission module 40 may need the operating power of 5.4 mW). Accordingly, an extra power supply is required.

Specifically, the transmission module 40 may include a modulation pin 401 to receive a modulation signal and a power pin 402 to receive power. The left channel audio signal L from the electronic device 11a may be converted by the ADC 21 and amplified by the boost circuit 22 to serve as a modulation signal MOD. The modulation signal MOD may then be sent to the transmission module 40 through the modulation pin 401 to perform modulation. Furthermore, the energy storage element 51 may be configured to provide power to the transmission module 40 through the power pin 402.

The ADC 21a may be configured to receive the right channel audio signal R from the electronic device 11a and convert the right channel audio signal R to a DC signal. Furthermore, the boost circuit 22a may be configured to amplify the DC signal and thereby generate a charging signal CHG.

The switching circuit 52 may be connected to the output port of the boost circuit 22a, the energy storage element 51 and the power pin 402 of the transmission module 40. The switching circuit 52 may include a single-pole-double-throw (SPDT) switch 52a. The SPDT switch 52a may be configured to connect the energy storage element 51 to the output port of the boost circuit 22a. The SPDT switch 52a may also be configured to connect the energy storage element 51 to the power pin 402 of the transmitter 40.

The energy storage element 51 may include a capacitor 51a having a first end 51a-1 which is grounded (GND) and a second end 51a-2 connected to the SPDT switch 52a. When the SPDT switch 52a is configured to connect the second end 51a-2 to the output port of the boost circuit 22a, the capacitor 51a may be charged by the charging signal CHG and energy may thus be stored in the capacitor 51a. When the SPDT switch 52a is configured to connect the second end 51a-2 to the power pin 402 of the transmission module 40, energy stored in the capacitor 51a may be provided to the transmission module 40 through the power pin 402.

Figure 5B:
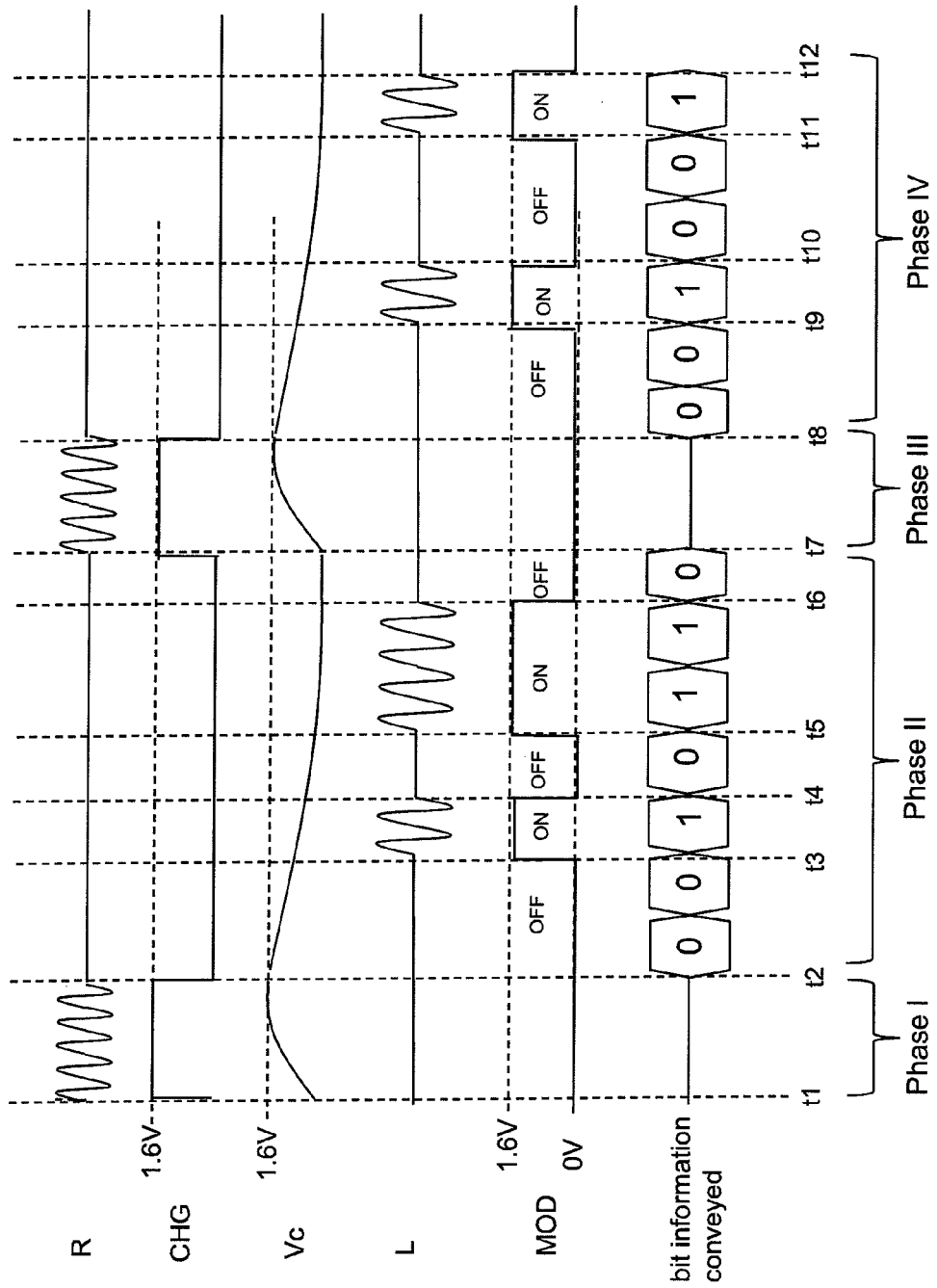
FIG. 5B is a timing sequence describing the left channel audio signal, the right channel audio signal and corresponding control signal(s) and modulation signal in the transmitter of FIG. 5A.

FIG. 5B is a timing sequence describing the left channel audio signal L, the right channel audio signal R and corresponding control signal(s) and modulation signal in the transmitter 20d of FIG. 5A. Referring to FIG. 5B, in phase I (t1-t2), the application software may ask the electronic device 11a to generate the right channel audio signal R which may then be converted into the charging signal CHG used to charge the capacitor 51a. Accordingly, the charging signal CHG may remain at a DC voltage of approximately 1.6V during the period between t1 an t2.

Furthermore, the SPDT switch 52a may be configured to connect the second end 51a-2 of the capacitor 51a to the output port of the boost circuit 22a, so that the capacitor 51a may be continuously charged by the charging signal CHG during the period between t1 and t2. At t2, the voltage $V_C$ at the second end 51a-2 of the capacitor 51a may reach approximately 1.6V. At t2, the application software may ask the electronic device 11a to stop generating the right channel audio signal R.

Next, in phase II (t2-t7), the transmission module 40 may have enough power to operate thanks to the energy stored in the capacitor 51a in phase I. Specifically, in phase II, the SPDT switch 52a may be configured to connect the second end 51a-2 of the capacitor 51a to the power pin 402 of the transmission module 40.

Furthermore, the application software may ask the electronic device 11a to generate the left channel audio signal L during the period between t3 and t4 and the period between t5 and t6. Accordingly, the modulation signal MOD may be used to perform the OOK modulation, and the transmission module 40 may be configured to transmit a modulated signal which conveys bits information of "0010110."

In phase II, energy stored in the capacitor 51a may be consumed by the transmission module 40. Accordingly, in phase III (t7-t8), the capacitor 51a may be charged again by the charging signal CHG. The charging mechanism in phase III may be similar to that in phase I.

Next, in phase (IV) (t8-t12), the modulation signal MOD may be used to perform the OOK modulation, and the transmission module 40 may be configured to transmit a modulated signal which conveys bits information of "001001."

Figure 6A:
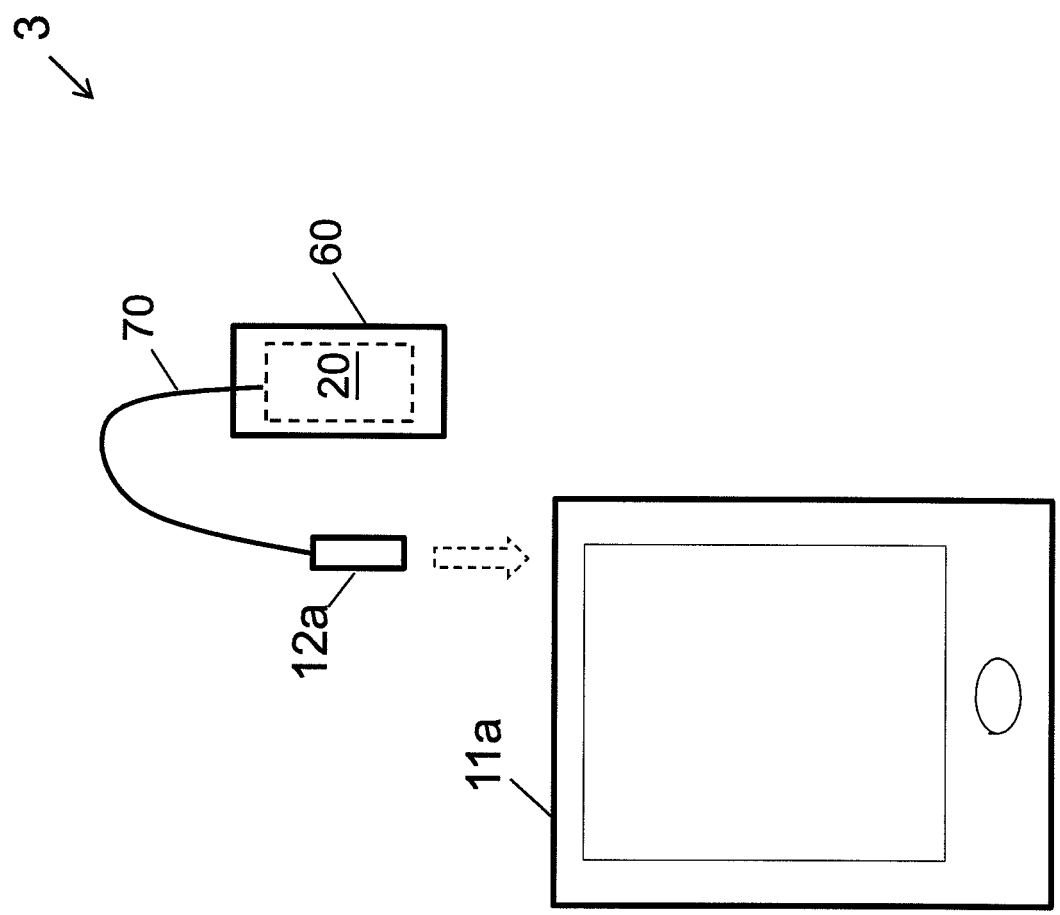
FIG. 6A is a schematic block diagram of the remote control in accordance with an example of the present invention.

FIG. 6A is a schematic block diagram of the remote control 3 in accordance with an example of the present invention. Referring to FIG. 6A, the remote control 3 may include a transmitter 20 which may be connected to an electronic device 11a through an audio connector 12a, for example, a phone connector. The transmitter 20 may be connected to the audio connector 12a through a wire 70. In this example of the present invention, the electronic device 11a may include a smart phone, and the transmitter 20 may be an integrated circuit (IC) which may be further integrated into a tag 60.

Figure 6B:
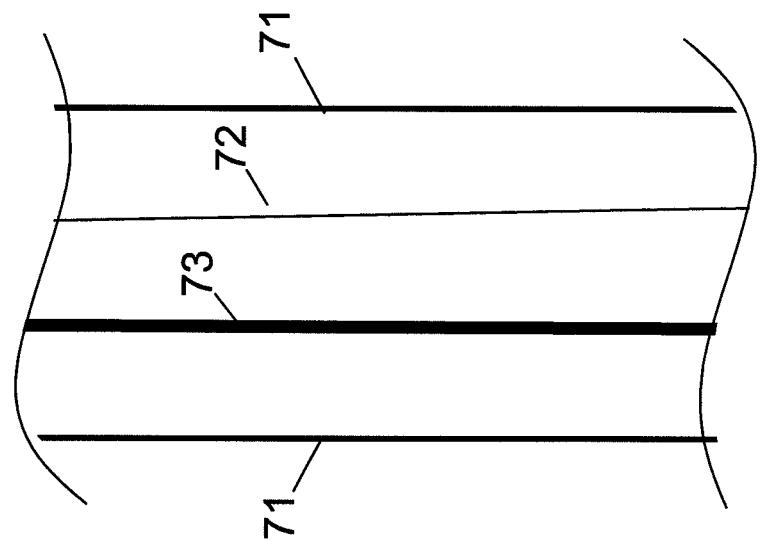
FIG. 6B is a schematic diagram illustrating the wire in the remote control of FIG. 6A.

FIG. 6B is a schematic diagram partially illustrating the wire 70 of the remote control 3 of FIG. 6A. Referring to FIG. 6B, the wire 70 may include a sheath 71 and lines 72 and 73 enclosed by the sheath 71. The line 72 may be used to transmit electrical signals and the audio signals from the electronic device 11a. Furthermore, the line 73 may be used to transmit electromagnetic signals. In other words, the line 73 may serve as an antenna of the transmitter 20. In one example of the present invention, the length of line 73 may range from approximately 2.5 centimeter (cm) to 5 cm. In another example, the length of line 73 may also be designed to fit one-fourth or half of the wavelength of an ultra-high-frequency (UHF) radio signal.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

I claim:

1. A transmitter for remote control, the transmitter comprising:
    a first analog-to-digital converter (ADC) configured to receive a first audio signal from a electronic device and convert the first audio signal to a first direct-current (DC) signal;
    a first boost circuit electrically connected to the first ADC to receive and amplify the first DC signal; and
    a transmission module electrically connected to the first boost circuit to receive the amplified first DC signal,
    wherein the amplified first DC signal is configured to modulate a carrier signal generated by the transmission module and the first audio signal is one of a left channel audio signal and a right channel audio signal output from the electronic device through an audio connector.

2. The transmitter of claim 1, wherein the transmission module comprises at least one inductor and capacitor configured to generate the carrier signal.

3. The transmitter of claim 1, wherein the transmission module comprises a phase-locked loop (PLL) frequency synthesizer and a power amplifier (PA) configured to generate the carrier signal based on a reference signal.

4. The transmitter of claim 3, wherein the transmission module further comprises a crystal oscillator configured to generate the reference signal in response to an activation signal.

5. The transmitter of claim 4 further comprises:
    a second ADC configured to receive a second audio signal from the electronic device and convert the second audio signal to a second DC signal; and
    a second boost circuit electrically connected to the second ADC to receive and amplify the second DC signal,
    wherein the amplified second DC signal is configured to activate the crystal oscillator to generate the reference signal.

6. The transmitter of claim 4, wherein the transmission module further comprises a controller configured to generate an activation signal, the activation signal is configured to activate the crystal oscillator to generate the reference signal.

7. The transmitter of claim 6 further comprises:
    a second ADC configured to receive a second audio signal from the electronic device and convert the second audio signal to a second DC signal; and a second boost circuit electrically connected to the second ADC to receive and amplify the second DC signal, wherein the amplified second DC signal is configured to trigger the controller to generate the activation signal.

8. The transmitter of claim 5, wherein the second audio signal is one of the left channel audio signal and the right channel audio signal other than the first audio signal.

9. The transmitter of claim 8, wherein an application software in the electronic device controls the generation of the first audio signal and the second audio signal.

10. A transmitter for a remote control in a remote control system, the transmitter comprising:
a first analog-to-digital converter (ADC) configured to receive a first audio signal from a electronic device and convert the first audio signal to a first direct-current (DC) signal;
a first boost circuit electrically connected to the first ADC to receive and amplify the first DC signal; and
a transmission module electrically connected to the first boost circuit to receive the amplified first DC signal, the transmission module comprising a phase-locked loop (PLL) frequency synthesizer and a power amplifier (PA) to generate a carrier signal,
wherein the amplified first DC signal is configured to modulate the carrier signal and the first audio signal is one of a left channel audio signal and a right channel audio signal output from the electronic device through an audio connector.

11. The transmitter of claim 10, wherein the transmission module further comprises a crystal oscillator connected to the PLL frequency synthesizer, the crystal oscillator is configured to generate a reference signal.

12. The transmitter of claim 11, wherein the reference signal is used to generate the carrier signal by the PLL frequency synthesizer and the power amplifier.

13. The transmitter of claim 12 further comprises:
a second ADC configured to receive a second audio signal from the electronic device and convert the second audio signal to a second DC signal; and
a second boost circuit electrically connected to the second ADC to receive and amplify the second DC signal,
wherein the amplified second DC signal is configured to activate the crystal oscillator to generate the reference signal.

14. The transmitter of claim 12, wherein the transmission module further comprises a controller configured to generate an activation signal, the activation signal is configured to activate the crystal oscillator to generate the reference signal.

15. The transmitter of claim 14 further comprises:
a second ADC configured to receive a second audio signal from the electronic device and convert the second audio signal to a second DC signal; and
a second boost circuit electrically connected to the second ADC to receive and amplify the second DC signal,
wherein the amplified second DC signal is configured to trigger the controller to generate the activation signal.

16. The transmitter of claim 13, wherein the second audio signal is one of the left channel audio signal and the right channel audio signal other than the first audio signal.

17. The transmitter of claim 16, wherein an application software in the electronic device controls the generation of the first audio signal and the second audio signal.

18. An integrated circuit comprising:
a transmitter of claim 1,
wherein the integrated circuit connects to a wire, the wire comprises:
a first line for transmitting an audio signal; and
a second line for transmitting an electromagnetic signal,
wherein the integrated circuit connects to an audio connector through the wire.

19. The integrated circuit of claim 18, wherein the audio signal is one of a left channel audio signal and a right channel audio signal output from a electronic device.

20. The integrated circuit of claim 19, wherein the electromagnetic signal is a modulated carrier signal generated by the transmitter.

21. The transmitter of one of claim 7, wherein the second audio signal is one of the left channel audio signal and the right channel audio signal other than the first audio signal.

22. The transmitter of claim 21, wherein an application software in the electronic device controls the generation of the first audio signal and the second audio signal.

23. The transmitter of claim 15, wherein the second audio signal is one of the left channel audio signal and the right channel audio signal other than the first audio signal.

24. The transmitter of claim 23, wherein an application software in the electronic device controls the generation of the first audio signal and the second audio signal.

* * * * *